United States Patent
Vovos et al.

(10) Patent No.: US 12,176,802 B2
(45) Date of Patent: Dec. 24, 2024

(54) MULTI-WIRE COMMON MODE CHOKE FOR INCREASING COMMON MODE TRANSIENT IMMUNITY AND MINIMIZING CIRCULATING CURRENT IN PARALLELED POWER SEMICONDUCTORS

(71) Applicant: BAE Systems Controls Inc., Endicott, NY (US)

(72) Inventors: Robert J. Vovos, Vestal, NY (US); Andrew S. Clark, Binghamton, NY (US)

(73) Assignee: BAE Systems Controls Inc., Endicott, NY (US)

( * ) Notice: Subject to any disclaimer, the term of this patent is extended or adjusted under 35 U.S.C. 154(b) by 224 days.

(21) Appl. No.: 18/067,309

(22) Filed: Dec. 16, 2022

(65) Prior Publication Data

US 2024/0204688 A1  Jun. 20, 2024

(51) Int. Cl.
*H02M 1/12* (2006.01)
*H01F 27/28* (2006.01)
(Continued)

(52) U.S. Cl.
CPC ........ *H02M 1/123* (2021.05); *H01F 27/2895* (2013.01); *H02M 1/08* (2013.01);
(Continued)

(58) Field of Classification Search
CPC ........ H02M 1/123; H02M 1/088; H02M 1/44; H01F 27/2895; H01F 41/069;
(Continued)

(56) References Cited

U.S. PATENT DOCUMENTS

| 6,917,271 B2* | 7/2005 | Zhang | H02M 7/493 336/83 |
| 8,487,604 B2* | 7/2013 | Ikriannikov | G05F 1/46 323/355 |

(Continued)

OTHER PUBLICATIONS

Zheng, Z., et al., "A practical example of hard paralleling SiC MOSFET modules", PCIM Asia 2019, Jun. 26-28, 2019, pp. 108-114.

(Continued)

*Primary Examiner* — Yusef A Ahmed
(74) *Attorney, Agent, or Firm* — Scully Scott Murphy & Presser PC (57) ABSTRACT

A multi-wire choke filter is implemented in an inverter module of a modular power control system for a vehicle. Such an inverter module includes gate driver circuits to control switching power transistors used to power loads in a vehicle. The switching power transistors and gate drivers are configurable to support both a three-phase and a single phase current drive driver circuit topology in which switching power transistors are connected in parallel to share driving currents and dynamic switching losses. In any configured topology, the multi-wire choke is connected in series between gate driver circuit components and switching power transistors to mitigate any EMI threat to the gate driver circuitry by presenting an impedance to reduce circuit susceptibility to any differential and common mode noise currents that can flow through the gate driver circuit that can overwhelm gate driver circuitry and negatively effect power transistor switching performance at any time.

12 Claims, 7 Drawing Sheets

(51) Int. Cl.
  *H02M 1/08*    (2006.01)
  *H02M 1/088*   (2006.01)
  *H02M 1/44*    (2007.01)
  *H02M 7/5387*  (2007.01)
  *H01F 17/00*   (2006.01)
  *H01F 41/069*  (2016.01)

(52) U.S. Cl.
  CPC .............. *H02M 1/088* (2013.01); *H02M 1/44* (2013.01); *H02M 7/5387* (2013.01); *H01F 2017/0093* (2013.01); *H01F 41/069* (2016.01)

(58) Field of Classification Search
  CPC .... H01F 2017/0093; H01F 17/04; H01F 5/00; H03K 17/0828
  See application file for complete search history.

(56) References Cited

U.S. PATENT DOCUMENTS

| | | | |
|---|---|---|---|
| 8,653,931 B2 | 2/2014 | Xu et al. | |
| 10,210,982 B1* | 2/2019 | Xu | H01F 17/062 |
| 10,516,392 B2* | 12/2019 | Sicard | H03K 17/168 |
| 10,574,223 B1* | 2/2020 | Xu | H03K 17/0424 |
| 10,868,529 B2* | 12/2020 | Norling | H03K 17/0828 |
| 10,903,834 B1* | 1/2021 | Lemberg | H05K 1/0263 |
| 10,917,081 B1* | 2/2021 | Nguyen | H03K 17/18 |
| 11,139,812 B2 | 10/2021 | Kempitiya | |
| 11,245,392 B1* | 2/2022 | Hsia | H03K 17/166 |
| 11,362,651 B1* | 6/2022 | Krug | H03K 17/0822 |
| 11,558,051 B1* | 1/2023 | Lemberg | H03K 17/6871 |
| 11,569,798 B2* | 1/2023 | Krug | H03K 3/011 |
| 11,867,762 B1* | 1/2024 | Nuebling | H03K 17/0822 |
| 11,876,509 B1* | 1/2024 | Zeng | H03K 17/166 |
| 2001/0045863 A1* | 11/2001 | Pelly | H02M 5/458 327/552 |
| 2008/0048779 A1 | 2/2008 | Crawley et al. | |
| 2008/0080106 A1* | 4/2008 | Mirafzal | H02M 1/12 361/42 |
| 2008/0238520 A1* | 10/2008 | de Rooij | H03K 17/0414 327/310 |
| 2008/0284367 A1* | 11/2008 | Kawashima | H02M 5/4585 318/700 |
| 2008/0312523 A1 | 12/2008 | Dunseath | |
| 2009/0303652 A1* | 12/2009 | Tallam | H02M 1/126 361/111 |
| 2010/0020450 A1 | 1/2010 | Guillot et al. | |
| 2013/0242438 A1* | 9/2013 | Fukuta | H02P 29/032 361/18 |
| 2014/0368240 A1* | 12/2014 | Shelton | H03K 17/107 327/109 |
| 2016/0025802 A1* | 1/2016 | Sicard | G01R 31/2608 324/762.08 |
| 2016/0124037 A1* | 5/2016 | Zhang | G01R 31/3275 324/762.08 |
| 2016/0173094 A1* | 6/2016 | Choi | H03K 19/017518 327/109 |
| 2018/0076771 A1 | 3/2018 | Gomez et al. | |
| 2018/0123579 A1* | 5/2018 | Fink | H03K 17/122 |
| 2018/0183228 A1* | 6/2018 | Huber | G01R 19/16571 |
| 2018/0205219 A1* | 7/2018 | Nagayoshi | H02M 7/48 |
| 2018/0205309 A1* | 7/2018 | Bleus | H02M 1/15 |
| 2018/0337667 A1* | 11/2018 | Jaksic | H03K 17/0828 |
| 2018/0358959 A1* | 12/2018 | Blakely | H03K 17/0822 |
| 2019/0204889 A1* | 7/2019 | Kaeriyama | H02M 1/32 |
| 2019/0386654 A1* | 12/2019 | Norling | H03K 17/0826 |
| 2021/0021121 A1 | 1/2021 | Lee et al. | |
| 2021/0029794 A1* | 1/2021 | Weiss | F21V 23/003 |
| 2021/0075388 A1* | 3/2021 | Ochi | H02H 9/005 |
| 2021/0099167 A1* | 4/2021 | Kempitiya | H03K 17/127 |
| 2021/0159898 A1* | 5/2021 | Westwick | H02M 1/08 |
| 2021/0305927 A1* | 9/2021 | Kirby | H02H 7/0822 |
| 2022/0029548 A1* | 1/2022 | Jeong | H02M 3/1588 |
| 2022/0182004 A1* | 6/2022 | Heckroth | H03K 17/145 |
| 2022/0182052 A1* | 6/2022 | Heckroth | H02P 27/08 |
| 2022/0190818 A1* | 6/2022 | Heckroth | H02M 1/0845 |
| 2022/0223328 A1* | 7/2022 | Vornkahl | H01F 17/062 |
| 2022/0294442 A1* | 9/2022 | Shibata | H02H 3/093 |
| 2022/0407308 A1* | 12/2022 | Song | G01R 31/2608 |
| 2023/0033695 A1* | 2/2023 | Alvi | H03K 17/0822 |
| 2023/0221363 A1* | 7/2023 | Rudiak | H03K 17/567 324/750.03 |
| 2023/0286384 A1* | 9/2023 | Ozguc | H02H 7/18 |
| 2024/0195402 A1* | 6/2024 | Kanale | H03K 17/0828 |
| 2024/0267039 A1* | 8/2024 | Asano | H03K 17/08142 |
| 2024/0291379 A1* | 8/2024 | Kolhatkar | H02M 1/32 |

OTHER PUBLICATIONS

International Search Report, PCT/US23/82506, mailed Jul. 9, 2024, 8 pages.

* cited by examiner

MULTI-WIRE COMMON MODE CHOKE FOR INCREASING COMMON MODE TRANSIENT IMMUNITY AND MINIMIZING CIRCULATING CURRENT IN PARALLELED POWER SEMICONDUCTORS

FIELD OF THE DISCLOSURE

This disclosure relates to power converters for vehicles such as battery electric vehicles and hybrid electric vehicles and more particularly, to a power conversion module including a multi-wire choke presenting impedances for reducing common mode high frequency transient voltages and currents for protecting power transistor gate driver control circuitry in the power conversion module.

BACKGROUND

Battery electric vehicles and hybrid electric vehicles have an electric machine such as a permanent magnetic electric machine electrically connected to an inverter. The electric machine is also mechanically connected to wheel axle(s) or turbine of the vehicle via a one or more mechanical connections.

A low voltage battery in the vehicle provides a first voltage. The first voltage is used to seed a primary or main power supply for the inverter. The main power supply generates a plurality of gate driver rails used to power two or more gate driver circuits to drive pairs of semiconductor switches of a power inverter. The pairs of semiconductor switches are connected in a h-bridge configuration between a high voltage DC bus (DC+ and DC−). The inverter may have one or more pairs of the semiconductor switches.

The low voltage battery is also used to seed a plurality of control power rails used to control the inverter. The inverter may also comprise a propulsion control unit such as a primary controller. The primary controller may receive torque and/or speed command(s) from another controller and generate commands to the gate driver circuitry. The torque and/or speed command(s) from this controller may be received via a communication interface, such as a control automation network (CAN). The control power rails provide power for the primary controller and the communication interface.

In operation and when the vehicle is ON, the primary controller and communication interface, receive the respective control power rails, which are in a predetermined range, and supplies the appropriate command to the gate driver circuits. The gate driver circuits, which are supplied with the gate driver rails, controls the gates of the semiconductors switches to turn ON/OFF to control the electric machine (a controlled state).

With respect to gate driver circuits, these circuits typically include a gate driver controller integrated circuit (IC) coupled to associated gate driver signal processing circuits that all receive power supply rail voltages generated from an associated power supply rail unit and provide the signals for controlling switching operations of the power transistors.

It is the case that the semiconductor switching at the high voltages and high frequencies implemented can provide an EMI threat to both low-voltage and high voltage sides of the gate driver circuitry driving the gates of switching semiconductor power transistors. Such EMI threat is manifested as differential mode voltage exceedances and common mode transient immunity (CMTI) exceedances at the driver, or circulating current in the gate drive loop. This is due to high switching speeds of the semiconductor transistor, parasitic capacitances to chassis through the gate driver and in the case of driving parallel single phase driving operation of switches, the presence of mismatched common source/emitter inductances and/or mismatched gate thresholds.

Filters are typically used to present impedances that will reduce the effect of unwanted signals such as transients in electronic circuits.

SUMMARY

Accordingly, disclosed is a filter comprising of a multi-wire choke that can be implemented in a gate driver circuit for reducing common mode and differential mode transients and reducing unwanted circulating current in the gate drive loop that can affect switching power transistor performance in a power conversion module.

In an aspect of the disclosure, there is provided a multi-wire common mode impedance choke for a power supply driver circuit driving a power switching transistor providing alternating current power to a load. The multi-wire common mode choke comprises: a first wire connected in series between a first output of a gate driver circuit driving the switching power transistor and a first terminal input (gate) of the switching power transistor device; a second wire connected in series between a second output of the gate driver circuit driving the switching power transistor and a second terminal (source/emitter) of the switching power transistor device; and a third wire connected in series between an overload detection control circuit and a third terminal (drain/collector) of the switching power transistor device, the first wire and second wire providing an impedance preventing common mode transient signals generated by the switching power transistor device from feeding back into a power transistor driver control device of the gate driver circuit; and the third wire providing a further impedance preventing differential mode transient signals generated by the switching power transistor from feeding back into the power transistor driver control device via a current overload protection conducting path.

In a further aspect, the first wire and second wire are magnetically coupled to provide an impedance preventing a feedback of said common mode transient signals to the gate driver control device.

In a further aspect, the third wire is magnetically coupled to the first wire and second wire to provide a further impedance preventing a feedback of said differential mode transient signals to the gate driver control device.

In an aspect of the disclosure, the magnetic inductance presented by each of the first, second and third wires is equal.

Embodiments of the invention will be described in more detail below, by way of illustrative and non-limiting examples, with reference to the accompanying drawings.

DETAILED DESCRIPTION

In accordance with aspects of the disclosure, a multi-wire common mode choke is incorporated in a power conversion module of a vehicle system to present impedances for protecting gate drive circuitry driving power inverter modules from unwanted high frequency common mode and differential mode signals. The vehicle system may be used in hybrid electric vehicle (HEV) or a battery electric vehicle (BEV). The vehicle may be a personal vehicle, such as a scooter, car, motorcycle and truck or a commercial vehicle such as a truck or bus, a maritime vehicle such as a boat or submarine or a military vehicle such as a tank, self-propelled artillery, or troop transport. The vehicle may also be an airplane, helicopter, UAV, and other powered air vehicles.

Figure 1:
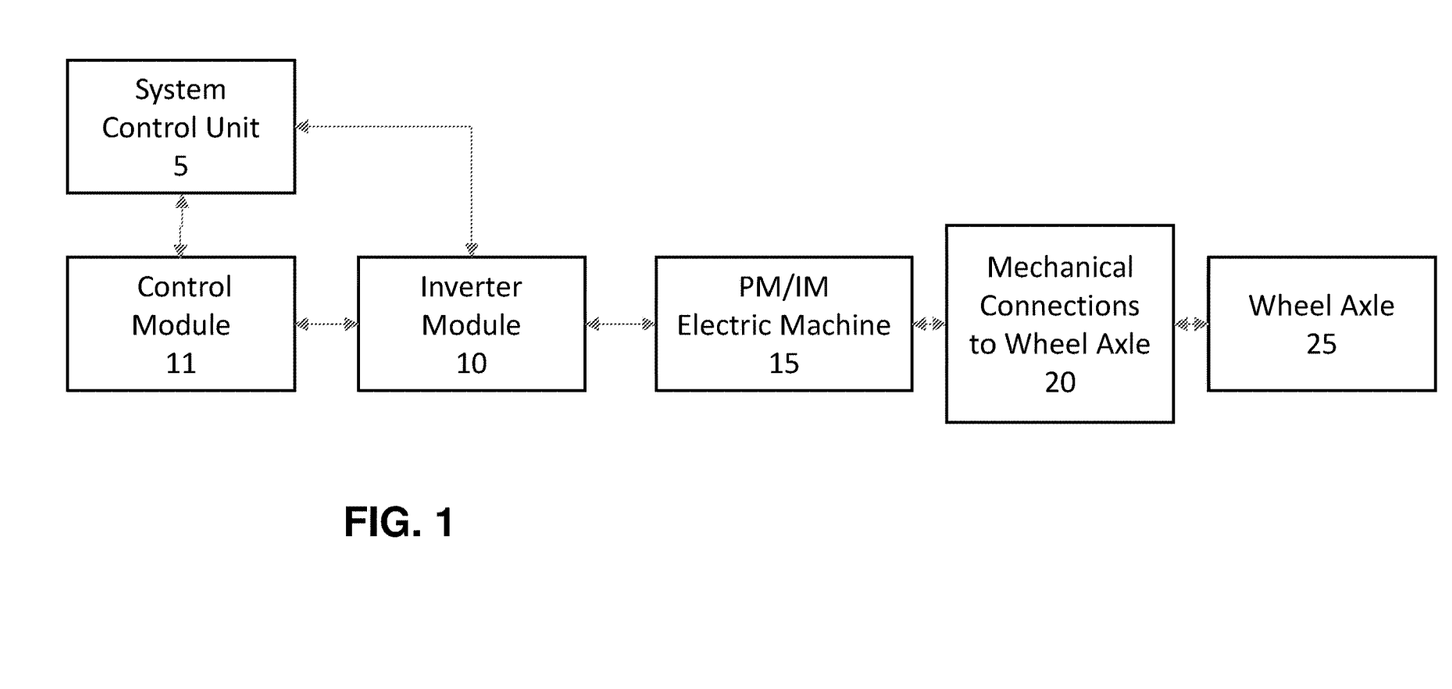
FIG. 1 illustrates an example of a vehicle system in accordance with aspects of the disclosure.

As shown in FIG. 1, the vehicle system may comprise a system control unit (SCU) 5, a control module 11, one or more inverter modules 10, one or more permanent magnetic (PM) or Induction electric machines (IM) 15, mechanical connections 20 and the wheel axles 25 (and wheels). In a case of airplanes, helicopters, UAVs and other powered air vehicles the PM electric machine may be connected to a turbine (or other propulsion mechanism) and not a wheel axles.

In some aspects of the disclosure, the control module 11 and inverter modules 10 may be part of a modular power control system (MPCS). A MPCS is a modular line replacement unit (LRU) containing a plurality of inverters modules and high voltage power distribution. The MPCS is scalable and customizable to have any number of inverter modules 10 and current interfaces. Different inverter modules may support and/or provide different phases of power. Each inverter module may have a wide bandgap switching unit having 3 or more phases of switching pairs. In some aspects of the disclosure, the wide bandgap switching unit 15 provide 3 phases. However, in other aspects, the wide bandgap switching unit 15 may provide 6 phases.

The control module 11 may control one or more inverter modules. In an aspect of the disclosure, the control module 11 may comprise one or more processors, memory and a communication interface. The communication interface may be control automation network CAN. The processor may be an FPGA. In other aspects of the disclosure, the processor may be a microcontroller or microprocessor or any other processing hardware such as a CPU or GPU. Memory may be separate from the processor (as or integrated in the same). For example, the microcontroller or microprocessor includes at least one data storage device, such as, but not limited to, RAM, ROM and persistent storage. In an aspect of the disclosure, the processor may be configured to execute one or more programs stored in a computer readable storage device. The computer readable storage device can be RAM, persistent storage or removable storage. A storage device is any piece of hardware that is capable of storing information, such as, for example without limitation, data, programs, instructions, program code, and/or other suitable information, either on a temporary basis and/or a permanent basis.

The communication interface may also be other network interfaces such as an ETHERNET, serial such as ARINC 429, 422, 485 interfaces or a wireless interface.

The MPCS may also comprise other modules not described herein.

The SCU 5 may also comprise a processor, memory and a communication interface. The SCU 5 communicates with the control module 11 and the inverter modules 10. The SCU 5 issues torque/speed commands to the control module 11 based on requests from an operator such as a driver of the vehicle via one or more inputs. The control module 11 receives these commands and generates corresponding control command for the respective inverter modules 10 and transfer the corresponding control commands to the inverter modules 10 such as via CAN.

The PM/IM electric machine(s) 15 may be surface permanent magnet electric machines, interior permanent magnet electric machines or induction electric machines.

The PM/IM electric machine 15 may be connected to the wheel axle(s) 25 (or turbine) via one or more mechanical connections 20. For example, the PM/IM electric machine 15 may be connected via a transmission, a drive shaft and a differential. The transmission may include a single or multiple gears. In other aspects of the disclosure, the PM/IM electric machine 15 may be included in an e-axle and the drive shaft may be omitted.

In some aspects of the disclosure, the inverter module(s) 10 and the PM/IM electric machine(s) 15 may be connected via cables. In other aspects of the disclosure, the PM/IM electric machine(s) 15 and the inverter module(s) may be integral.

Figure 2:
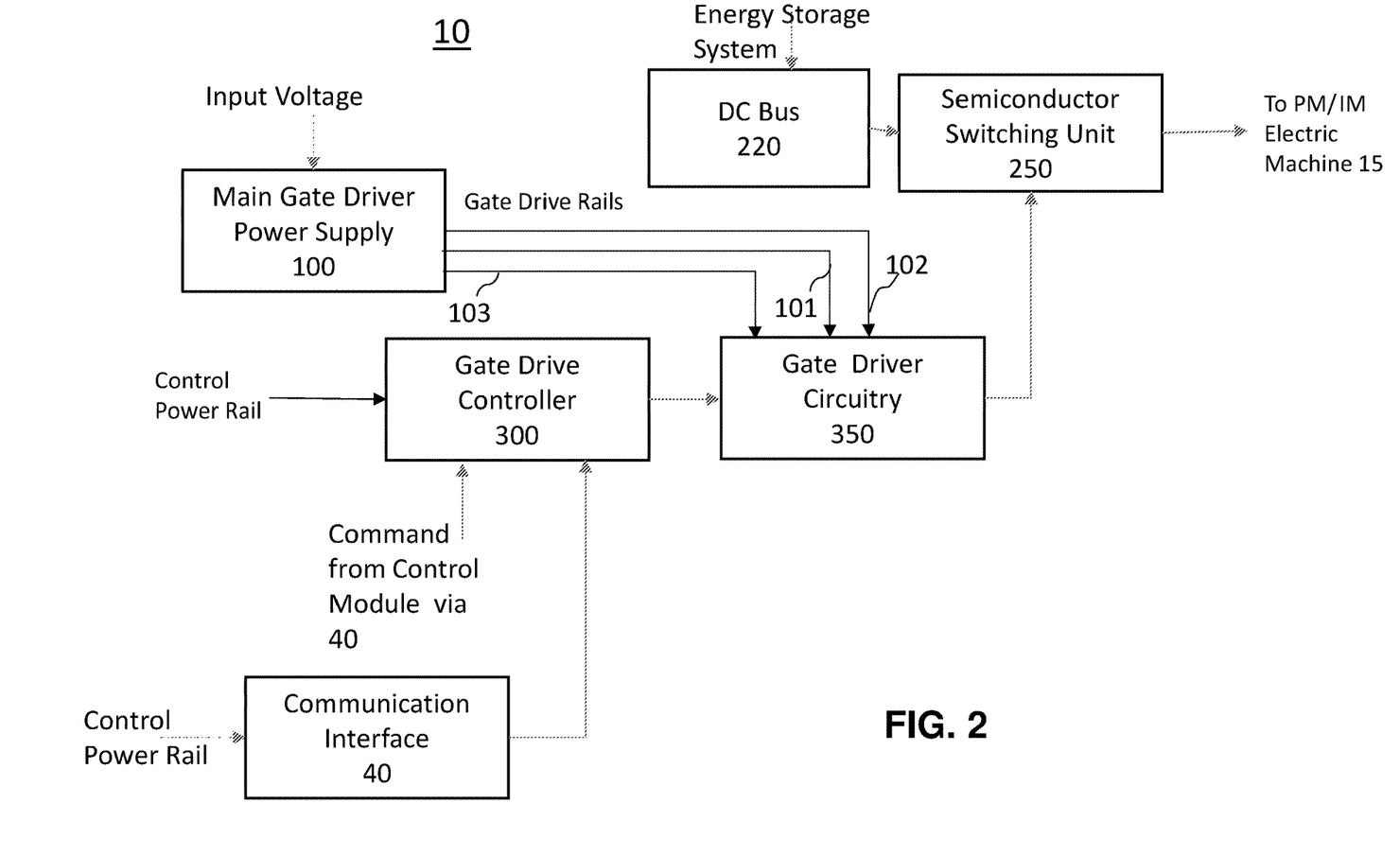
FIG. 2 illustrates an example of an inverter module including power supply and gate driver circuitry protected in accordance with aspects of the disclosure.

FIG. 2 illustrates an example of a portion of an inverter module 10 in accordance with aspects of the disclosure. The inverter module 10 may comprise a main gate driver power supply 100, a DC bus 220 that receives power from an energy storage system, e.g., a battery (not shown), a semiconductor switching unit 250 for driving the PM/IM electric machine 15, a gate drive controller 300 (primary controller), gate driver circuitry 350, and a communication interface 40.

Figure 3:
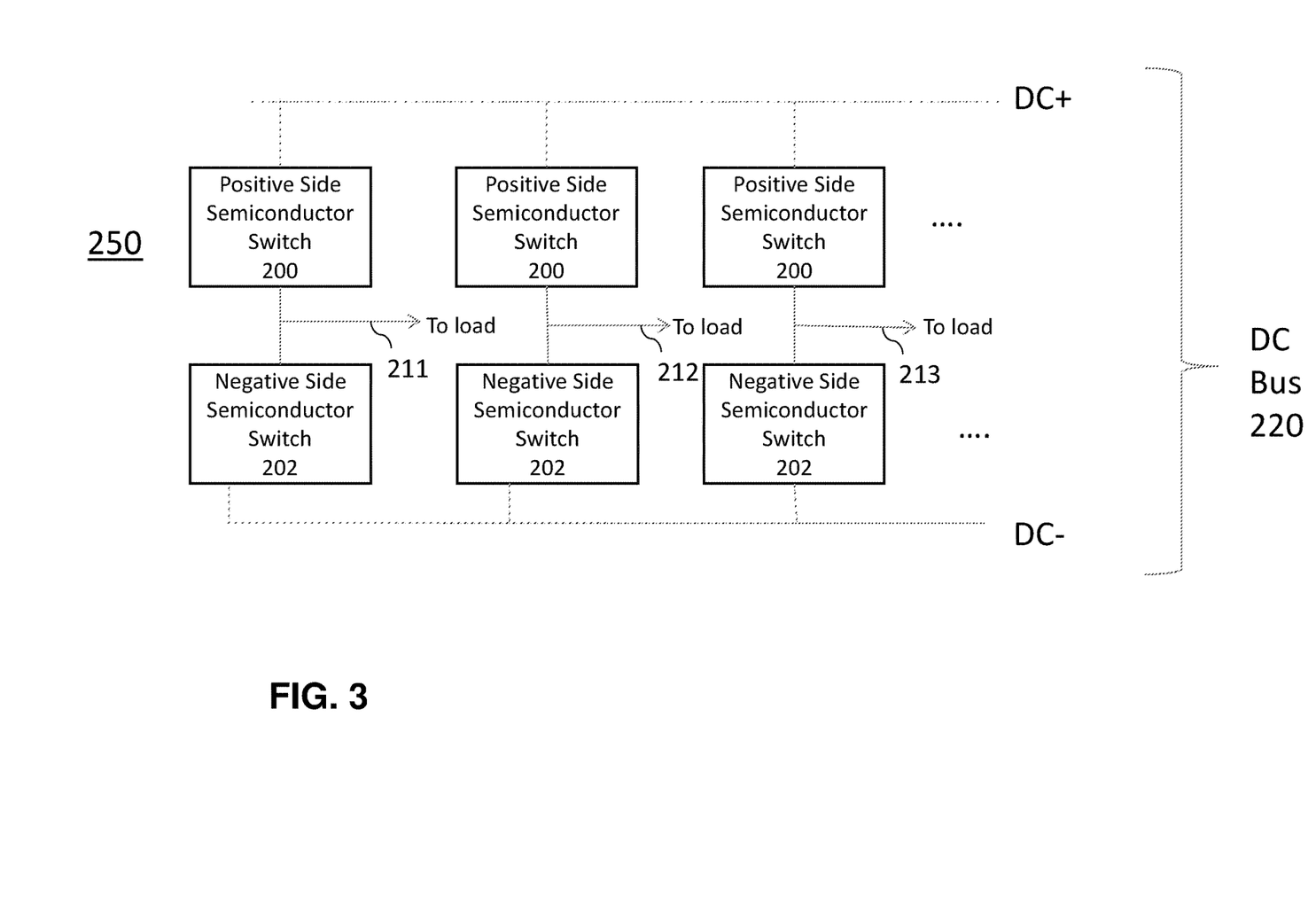
FIG. 3 illustrates an example semiconductor switching unit in accordance with aspects of the disclosure.

The semiconductor switching unit 250 comprises a plurality of pairs of semiconductor switches as illustrated in FIG. 3. Each pair of semiconductor switches 200, 202 is connected in a H bridge configuration between a positive DC rail and a negative DC rail of a DC bus 220. The pairs of semiconductor switches comprise a positive side semiconductor switch 200 (connected to the positive rail DC+) also referred to herein as HIGH and the negative side semiconductor switch 202 (connected to the negative rail DC−) also referred to herein as LOW.

The number of pairs of semiconductor switches 200, 202 depends on the number of phases supported by the inverter module 100. For example, for an inverter module 100 supporting a single phase 211, there may be a single pair of semiconductor switches 200, 202. However, for an inverter module 10 supporting three-phases 211, 212, 213, there may be three pairs of switches 200, 202. Supporting (of phases) as used herein is different than outputting to an electric machine such as the PM/IM electric machine 15 (where outputting is dependent upon the type of load being driven). Multiple phases may be independently output to an electric machine. In other aspects, the phases may be connected in parallel such that one output is supplied (one terminal).

The phases 211, 212, 213 from the wide bandgap switching unit 250 may be connected in parallel. For example, the three phases from 3 pairs of wide bandgap semiconductor switches may be connected in parallel to provide a single phase. The current (RMS) for the single phase may be set as needed per a specific application. In some aspects of the disclosure, the single phase may be connected to an electric machine such as a traction motor. In some aspects of the current may be up to about 1125 A RMS (for the single phase).

In other aspects of the disclosure, the inverter module may provide three separate phases where the current in each phase may also be set as needed per the specific application. The three-phases may be used for an electric machine such as an integrated starter generator/motor (ISGM). In some aspects of the disclosure, the current in each phase may be up to 375 A RMS.

The semiconductor switches 200, 202 may be transistors such as Insulated-gate bipolar transistors (IGBT) or field effect transistors (FETS). For example, the FETs may be wide bandgap semiconductor such as, but not limited to, silicon carbide (SiC) or gallium nitride (GaN). The switching frequency of the semiconductor switches 200, 202 may be application specific and designed to achieve a target power.

As further shown in FIG. 2, the main gate driver power supply unit 100 provides gate drive rail voltages 101, 102, 103 for use by the gate driver circuitry 350 in the power inverter module 10.

In an embodiment, the main gate driver power supply 100 is seeded by a low voltage power (identified in the figures as "Input Voltage"), supplied either directly or indirectly via an external low voltage battery. The external low voltage battery may be a starting, lighting and ignition battery (SLI). In an embodiment, the control power rails include a voltage (s) for the gate drive controller 300, a voltage for the communication interface 40, etc. In some aspects of the disclosure, the SLI voltage may also be a control power rail.

The main gate driver power supply 100 provides a plurality of power rail for the gate driver circuitry 350 (gate drive rails). The connections to and within the plurality of main gate driver power supplies may be based on the number of pairs of semiconductor switches 200, 202 and the configurations thereof. For example, when there are three sets of pairs, such as three phases, e.g., u, v, w, the pairs may be separately driven and independent or connected in parallel.

When the three sets of pairs are separately driven, there may be six independent and separate main gate driver power supplies, e.g., one per separately driven semiconductor switch. In other aspects, when the three sets of pairs are connected in parallel, there may be only two independent and separate supplies, three are connected together and share current (LOW and HIGH).

As further shown in FIG. 2, the main gate driver power supply 100 is seeded by a low voltage (input voltage). This input voltage may be an SLI voltage or a voltage boost therefrom Vboost. The input voltage is applied to a power converter element (not shown) which may be an open loop peak charge converter with post-regulation. In some aspects, the power converter may comprise a transformer, rectifiers, filters, capacitance and a linear regulator operating to output a preset voltage that can be regulated to provide target gate drive rails (voltages). In an aspect of the disclosure, there may three voltage rails 101, 102 and 103 of values set by a voltage regulator circuit (not shown) which may be a precision shunt regulator adjustable to customize the rails (gate drive rails) as needed.

The specific values of the gate drive rails may be based on the gate driver circuitry 350. In some aspects of the disclosure, the second rail 102 may provide a reference such that when the first rail 101 is referred to in the following description it is the voltage between the first rail 101 and the second rail 102 (difference) (HIGH) and when the third rail 103 is referred to in the following description is it the voltage between the third rail 103 and the second rail 102 (difference) (LOW). The separate rails 101, 102, 103 are maintained by capacitances (not shown) between the first rail 101 and the second rail 102 and capacitance between the second rail 102 and the third rail 103. In some aspects of the disclosure, the first rail 101 and third rail 103 are set to hard drive the gates of the semiconductor switches 200, 202. In a parallel configuration supporting a single-phase power inverter driving operation the gate drive power supplies two (one highside, one lowside) independent isolated, e.g., +15V/−5V power supply rails respectively, to support the paralleled (sharing switching losses, shared conduction losses) driving of the semiconductor switching (SiC MOSFET, GaN FET, IGBT).

Figure 4:
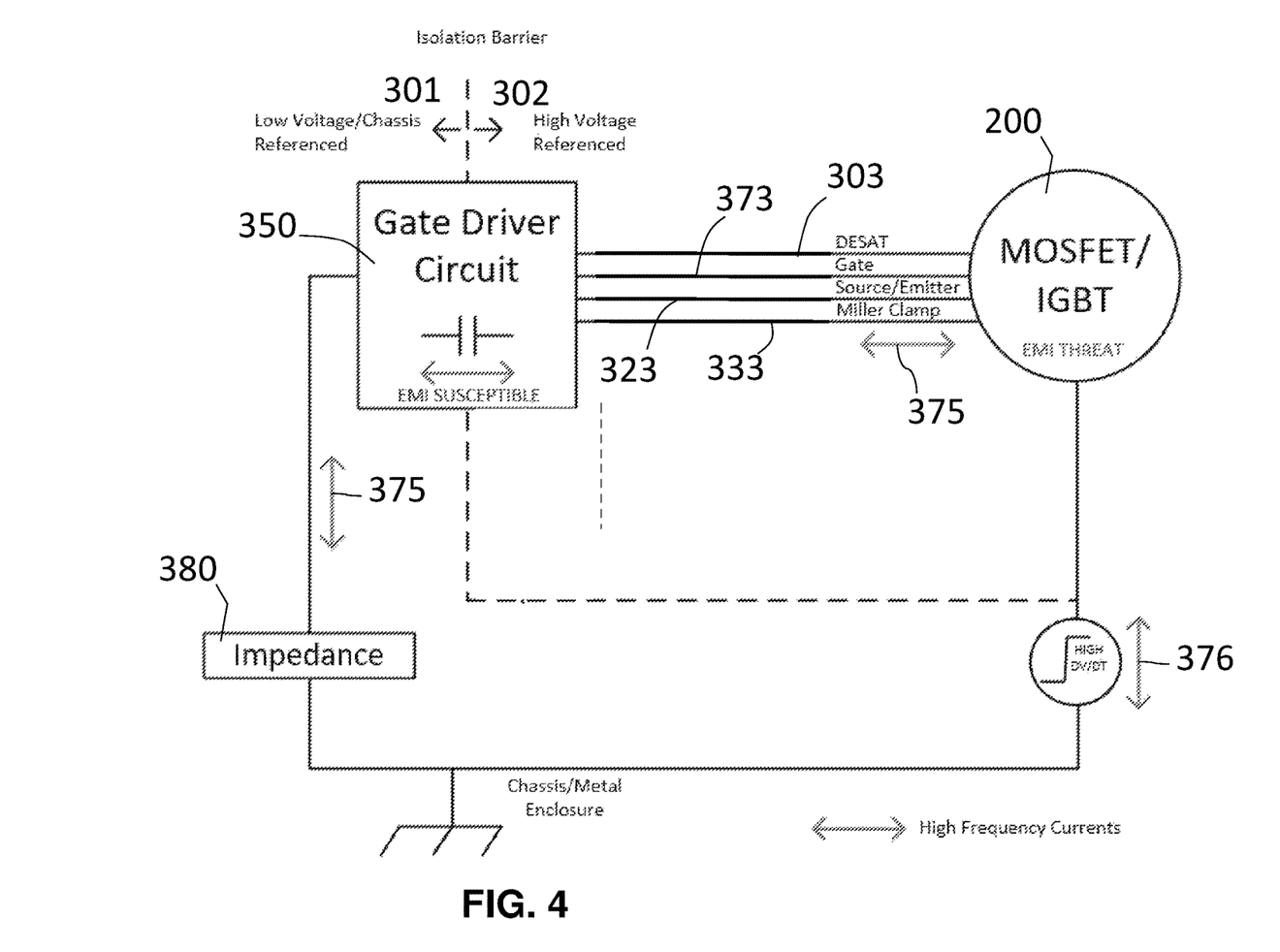
FIG. 4 illustrates an example of the sources of the electromagnet interference (EMI) threat provided to the gate driver circuitry due to switching power transistor operation

FIG. 4 illustrates example sources of the electromagnet interference (EMI) threat presented to the low voltage 301 and high voltage 302 operations at the gate driver controller/gate driver circuitry due to the high power, high frequency power transistor switching operations. A prime manifestation of the EMI threat is in the form of a differential mode (DM) noise and common mode (CM) noise, e.g., high frequency common mode currents 375 that can circulate in the gate driver circuitry 350 and cause differential mode voltage disturbances, e.g., due to the presence of impedances presented by a variety of causes. As shown in FIG. 4, in a non-limiting embodiment, these CM noises can manifest in either gate driving topology including: 1) the independent configuration where the gate drivers provide six independent isolated gate drive signals (+15V differentially Gate to Source for MOSFET to turn on, −5V differentially Gate to Source for MOSFET to turn off) for six independent semiconductor switches (SiC, GaN, IGBT); and 2) the paralleled configuration in which the three independent gate drivers function as a single gate driver with circuitry adjusted to configure the rising and falling voltages on the gates to track each other so that the turn on and turn off thresholds on the paralleled devices are hit at the same moment in time to allow the dynamic switching losses of semiconductor devices to share equally and allow equal heating/power stress to the devices.

FIG. 4 generally depicts the interconnection of the gate driver circuitry 350 including gate driver controller IC (not shown) and the switching power, which for non-limiting purposes of description, is hereinafter referred to as a switching power transistor 200 (e.g., MOSFET or IGBT). As shown, the gate driver circuitry 350 provides, through a gate driver controller integrated circuit (IC) a current boosted gate drive signal carried on conductor gate 373 and source/emitter 323 for driving ON/OFF the switching power transistor 200.

The source/emitter 323 terminal of the switching power transistor 200 is also typically used as the local ground reference in the gate driver circuit 350. The ground reference is used in conjunction with the Desat 303 signal conductor.

A further Desat signal conductor 303 is connected to the gate driver controller IC implementing a Desaturation (Desat) detection feature including an overload protection circuit for the power switching transistor MOSFET or IGBT (power inverter) 200. This desaturation fault detection feature implements a circuit (not shown) receiving the Desat voltage that provides protection for a power switching transistor 200 against short-circuit current events which may lead to destruction of these power switches. A DESAT input pin of the gate driver controller IC (not shown) monitors the VDS (drain-source) voltage of the switching power transistor MOSFET while it is on, and if the protection threshold is reached, the Desat protection is tripped, and the switching power transistor (e.g., MOSFET) is turned off. The Desat line 303 carrying the VDS voltage to the Desat fault detection circuitry is susceptible to noise currents that can be differential or CM.

A further line 333 providing a Miller clamp analog output signal that allows the control of the Miller current during the power stage switching in half-bridge configurations is additionally provided to the power switching transistor 200. It is known that the switching power transistor may turn on due to additional charge from a Miller capacitance caused by a high voltage slew rate transition on the (drain or collector). To prevent switching power transistor to turn on, an gate drive controller IC CLAMP pin (not shown) is connected to the gate and Miller current is sunk through a low impedance CLAMP transistor (not shown). This Miller clamp line 333 is further susceptible to noise currents that can be differential or CM.

As shown in FIG. 4, it is the case, in operation, a parasitic impedance 380 can develop in the gate driver circuitry 350 increasing EMI susceptibility. The unwanted impedance 380 can manifest at the low-voltage side of the driver circuit due to trace inductances (e.g., in the printed circuit board), CMOS gate driver circuit output drivers and CMOS input circuits and provides a path of high frequency currents 375 to the gate driver circuit 350. The current that will flow through the gate driver circuit 350 will interact with the impedance 380 on the low voltage side of the driver and cause potential voltage exceedances of the circuitry. Minimizing the current that flows will help make the gate driver circuitry more immune to the threats as smaller voltage disturbances are created. In one aspect, these high frequency currents 375 may be circulating current loops and constitute a differential mode (DM) signal "noise", e.g., caused by unmatched input/output impedances and current return paths through local reference grounds. These noise currents 375 further constitute Common Mode signal "noise" due to the parasitic capacitances that can exist between cabling and connectors to system or chassis ground and form additional impedances in the high voltage and the high frequency switching circuit that provide a path of low impedance for high frequency current currents 375 that could negatively impact switching performance and reliability. The gate driver circuit is particularly susceptible to high voltage dV/dt signal flow 376 present due to the high frequency switching transistors relative to the chassis that can potentially overwhelm sensitive circuitry.

Figure 5:
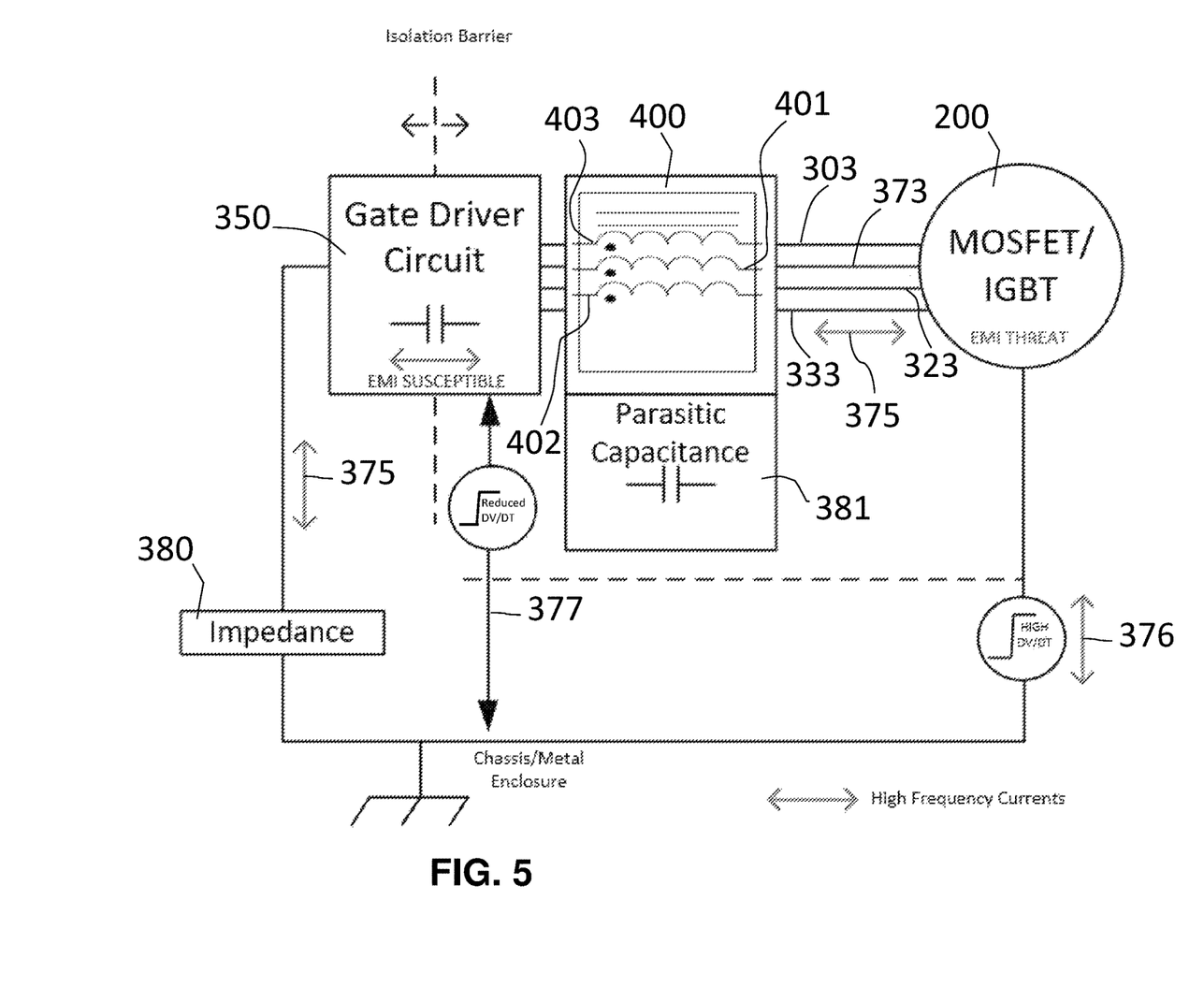
FIG. 5 depicts the physical connection of a multi-wire choke according to aspects of the present disclosure to mitigate the EMI threat to the gate driver circuitry by reducing any differential and common mode noise currents that can flow through the gate driver circuit at any given time.

As shown in FIG. 5, according to aspects of the present disclosure, to mitigate the EMI threat to the gate driver circuitry, a multi-wire choke 400 is implemented in the high voltage section of the gate driver circuit that functions to reduce common mode noise currents that can flow through the gate driver circuit at any given time.

As further shown in FIG. 5, the multi-wire choke 400 is installed in series between the signal lines connecting the power switching transistor 200 to the corresponding gate driver circuitry 350. The choke is a magnetic core having copper wires wound around it to form magnetically coupled inductor coils. In an embodiment, the magnetic core is a ferrite material, e.g., in the shape of a toroid, having at least three copper windings forming three coils 401, 402, 403 about the core 405. The multi-wire core 400 provides a common mode impedance at the offending frequencies (e.g., 20 MHz-30 MHz) in the gate driver circuit. For example, each power MOSFET switch 200 creates an additional current flow at 20 kHz to 25 MHz (due to parasitic events). The common mode choke particularly presents an impedance that resists the flow of current and in combination with parasitic capacitance in the gate driver circuit 350 also provides a small LC filter resulting in the reduction of the dV/dt signals 377 so that the gate driver circuit 350 will not see the full amplitude of high dV/dt 376.

Figure 6:
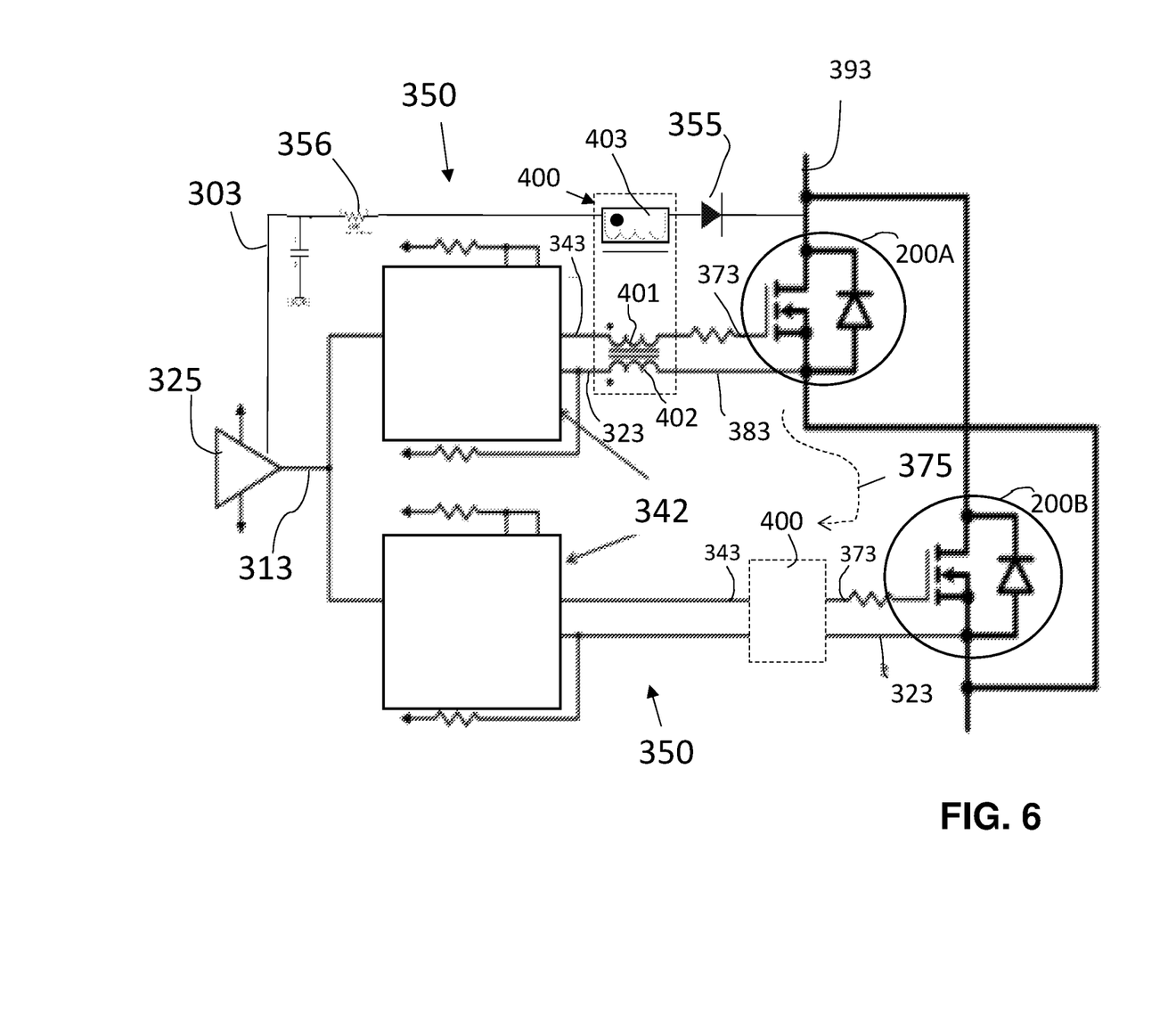
FIG. 6 depicts a single phase (current shared) parallel configured switching power transistors in which a multi-wire choke is connected to reduce common mode noise currents that can flow through the gate driver circuit.

In an embodiment, whether the driver circuit is configured for either 3-phase operation, e.g., as shown in FIG. 5, or as a single phase (current shared) configuration in which power switching transistors, e.g., 200A, 200B are parallel-connected and driven by a single common gate driver circuit 350, as shown in FIG. 6, the two wire coils 401, 402 of the multi-wire choke 400 are magnetically coupled and configured in series with signal lines source/emitter 323, 373 to present an impedance for any common mode high frequency signals present at the high voltage side of the gate driver circuit 350. For example, as shown in FIG. 6, the common mode multi-wire choke 400 presents a low impedance to normal gate currents, i.e., where the in and out currents are equal, but presents a high impedance to unwanted source currents flowing only in the source connection 383. The two wire coils prevent circulating current between parallel MOSFETs. That is, as the gate driver moves 800 V in rise and fall times of tens of nanoseconds, the 2-wire choke prevents high frequency current (e.g., noise) from going back into the gate driver loop. This is beneficial for current sharing and helps noise reduction for the fast switching MOSFET inverter devices.

In accordance with an aspect of the present disclosure, a third wire coil 403 of the multi-wire choke 400 is connected to the drain (or collector) terminal to provide the Desat overload protection signal line 303 with an additional impedance to resist flow of any differential mode noise produced at the drain terminal 393 of the switching power MOSFET 150. That is, in any gate driver configuration, hundreds of volts at tens or hundreds of nanosecond switching durations could be presented at Desat monitoring line 303 which could trip the Desat overload protection input of a gate driver integrated circuit 325 (e.g., an STGAP1AS available from STMicroelectronics). Typically, a Desat diode 355 that is connected in series with a resistor 356 at the Desat line monitors the voltage across the drain and source of the power switching MOSFET (or the VCE of an IGBT) already provides an impedance in the series connection. However, given the large magnitude high frequency currents presented, there would be unintending activation of the Desat (false Desat trips). As the currents on the Desat line 303 can be differential or, as a CM voltage that develops across the other windings in the choke 400 can corrupt the differential mode signal that is present on the DESAT signal, the third wire coil 403 of the multi-wire choke 400 further resists flow of any CM noise at the Desat line 303.

As shown in FIG. 6 depicting an example shared current configuration in which the single gate driver IC 325 controls gate drive circuitry 350 of each of two parallel connected switching power MOSFET devices 200A, 200B, the two coil wires 401, 402 of the multi-wire common mode choke 400 prevent circulating currents in the parallel configuration which could be due to mismatched common source/emitter inductance in the switches and/or mismatched gate-source or gate-emitter threshold voltages. The third inductor (wire coil) 403 of the multi-wire choke 400 is magnetically coupled to the other two-wire coils 401, 402 of the choke 400 and is connected in series between the DeSat circuit conductor line 303 and the drain terminal 393 of the switching power transistor 200.

With more particularity, in the multi-wire common mode choke 400 shown in FIG. 6, one inductor (wire coil) 401 is connected in series at between an output signal line 343 of a current booster circuit block 342 that receives the power switching transistor gate drive signal 313 from the gate driver IC 325 and boosts its current for driving the power switching transistor 200A and the gate input terminal line 373 of the switching MOSFET 200A. The second inductor (wire coil) 402 of the multi-wire choke 400 is a further series connection between the source terminal 383 of the switching power MOSFET 200A and the local gate driver ground reference 323 of the gate driver IC of gate driver circuit 350. As shown in FIG. 6, these 2-wires 401, 402 of the choke 400 provide rejection of common mode signals present due to the switching operation of the switching power MOSFETs 200A, 200B when in parallel (current shared) operation. These common mode signals are present due to source nodes of the parallel switches turning on at not the exact same time during the high-frequency switching which produces large dynamic voltages at a high frequency that presents between the source of one switch 200A and the adjacent switch 200B being driven at the same time. The third inductor (wire coil) 403 of the multi-wire choke 400 is magnetically coupled to the other two-wire coils 401, 402 of the choke 400 and is connected in series between the DeSat circuit conductor line 303 and the drain terminal 393 of the switching power transistor 200. More particularly, third inductor (wire coil) 403 connects between the DeSat diode 355 (anode) in the DeSat path 303 and a current limiting desaturation resistor 356 coupled on the DeSat conductor line 303 that connects to a DeSat detection pin input of the gate driver integrated circuit 325. The inductances presented by the wire coils of multi-wire choke 400 reduces gate driver circuit susceptibility to dv/dt common mode transients (due to the high frequency switching transistors) relative to the chassis and the low voltage side of the gate driver circuitry and that would be presented across the gate driver integrated circuit 325 itself. The additional protection afforded by the third wire 403 of the common mode choke is indispensable for protecting the gate driver IC 325 against the large dynamic common mode voltages (noise) and any false DeSat activations in both three-phase gate driver and single-phase gate driver configurations. Thus, in single phase, there is noise rejection and stopping of circulating current when the devices are parallel (current sharing). Thus, common mode immunity is increased in the gate driver circuitry by adding to the additional turns of the third coil 403 in the multi-wire choke 400.

Figure 7:
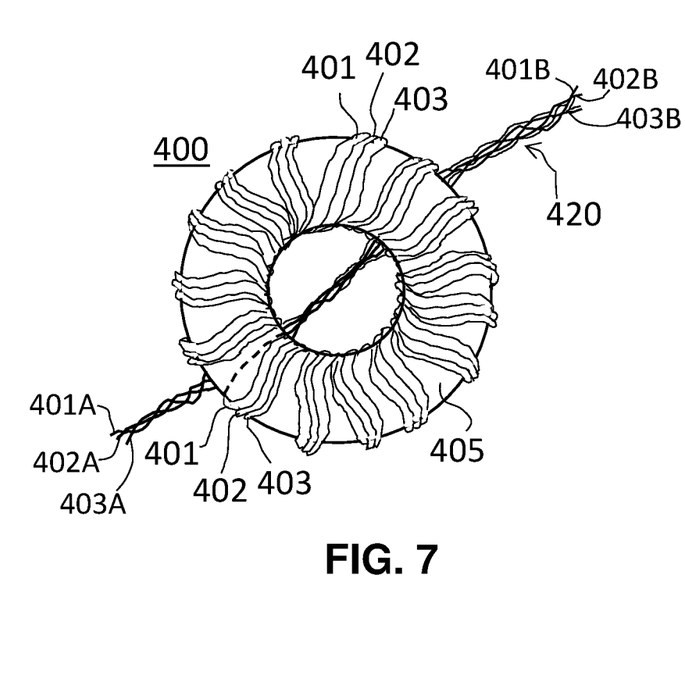
FIG. 7 depicts a diagram of the multi-wire choke that includes three coiled copper wires wrapped around a toroidal core in non-overlapped fashion.

FIG. 7 depicts a diagram of the multi-wire choke 400 that includes the three coiled copper magnetic wires 401, 402, 403 wrapped around a toroidal core 405 in non-overlapped fashion. That is, as shown in FIG. 7, the layer to layer copper magnetic wires from each side (e.g., primary side 401A, 402A, 403A and secondary side 401B, 402B, 403B) of the choke in the printed wiring board on which the circuitry is formed minimize the overlap to each other in order to avoid any additional parasitic capacitance in the circuit card. The dashed line shows how the wires are routed out of the choke. The choke 400 includes a high frequency ferrite material core 405 to present an impedance to the high frequency voltages that can develop. The ferrite material can be any material, e.g., iron oxides combined with nickel, zinc, and/or manganese compounds that can present a lossy impedance at the offending frequencies. This will help damp any LC resonance that can exist in circuit. In a non-limiting embodiment, the core 405 can be a small ferrite material toroid of about 5.8 mm in diameter, however other core design, e.g., E-cores U-cores, ER-cores, etc. can be used if the circuit printed wiring board space permits. The wire coils can be a twisted "triple" of magnetic wire 420 (i.e., three wound copper wires twisted together) such as 30 AWG-32 AWG gauge copper wire although the thickness can range anywhere from between 28-36 AWG. The number of turns N for each coiled wire 401, 402, 403 around the core 405 can be about N=15 to each present about 38 µH (microhenry) nominal of inductance+/−20% µH. A suitable bobbin or header (surface mounting hardware) connection (not shown) is provided to connect each coil wire of the twisted triple to the circuit connections on the printed circuit wiring board card (not shown) containing the gate driver circuit of the power inverter module. Thus, for example, first wire 401 includes a respective first end 401A connected to the signal line 343 of a current booster circuit block 342 that receives the power switching transistor gate drive signal 313 and a second end 401B connecting to the gate input terminal 373 of the switching power transistor, second wire 402 includes a respective first end 402A connected to the local gate driver ground reference 323 of the gate driver IC of gate driver circuit 350 and a second end 402B connected to source the terminal 383 of the switching power MOSFET 200A, and the third wire 403 includes a respective first end 403A connected to one end of the current limiting desaturation resistor 356 connected on the DeSat conductor line 303 and a second end 403B connected to the anode of the DeSat protection diode 355 that connects to the power transistor drain/collector terminal 393.

Returning to FIG. 5, In an embodiment, an additional wire (i.e., a fourth wire coil) can be further wound around the core for magnetic coupling with the other three wire coils 401, 402, 403 for presenting an impedance at the Miller clamp input at the gate driver circuit in series with Miller claim conductor line 333 to remove common mode transients (and increase common mode transient immunity (CMTI)). Thus, the twisted mag wire 420 can be a "quadruple" if the additional Miller clamp sense circuit configuration is implemented with the same amount of N turns.

With the addition of multi-wire choke 400, the gate driver Common Mode Transient Immunity (CMTI) rating of the date driver circuitry of the power inverter module can be improved. The design of the choke minimizes the differential mode (aka leakage or stray) inductance in the physical construction of the device so that the high slew rate edges of the gate drive are not disturbed. This can be implemented with triple or quadruple twisted magnetic wires being used for the construction of the multi-wire choke 400.

In the discussion and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein. For example, the term about when used for a measurement in mm, may include +/0.1, 0.2, 0.3, etc., where the difference between the stated number may be larger when the state number is larger. For example, about 1.5 may include 1.2-1.8, where about 20, may include 18.0-22.0.

As used herein, the term "substantially", or "substantial", is equally applicable when used in a negative connotation to refer to the complete or near complete lack of an action, characteristic, property, state, structure, item, or result. For example, a surface that is "substantially" flat would either completely flat, or so nearly flat that the effect would be the same as if it were completely flat. "Substantially" when referring to a shape or size may account for manufacturing where a perfect shapes, such as circular or sizes may be difficult to manufacture.

As used herein terms such as "a", "an" and "the" are not intended to refer to only a singular entity, but include the general class of which a specific example may be used for illustration. As used herein, terms defined in the singular are intended to include those terms defined in the plural and vice versa.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

For purposes of the description hereinafter, the terms "upper", "lower", "right", "left", "vertical", "horizontal", "top", "bottom", and derivatives thereof shall relate to a device relative to a floor and/or as it is oriented in the figures or with respect to a surface.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. A multi-wire common mode impedance choke for a power supply driver circuit driving a switching power transistor providing alternating current power to a load, the multi-wire common mode impedance choke comprising:
   a first wire connected in series between a first output of a gate driver circuit driving said switching power transistor and a first terminal input of the switching power transistor;
   a second wire connected in series between a second output of the gate driver circuit driving the switching power transistor and a second terminal of the switching power transistor; and
   a third wire connected in series between a gate driver control integrated circuit (IC) device of said gate driver circuit and a third terminal of the switching power transistor, wherein each of the first wire, the second wire and the third wire is wound around a core to form a respective first inductor coil, second inductor coil and third inductor coil of the multi-wire common mode impedance choke;
   said first inductor coil and said second inductor coil are magnetically coupled to form an impedance preventing common mode transient signals generated by the switching power transistor from feeding back into the gate driver control IC device of the gate driver circuit;
   said third inductor coil is magnetically coupled to said first inductor coil and said second inductor coil to form a further impedance preventing differential mode transient signals generated by the switching power transistor from feeding back into the gate driver control IC device via a current overload protection conducting path, said current overload protection conducting path comprising a series connection of a desaturation diode and a series resistor, said third inductor coil being connected in series between one end of said desaturation diode and a first end of said series resistor, and
   said desaturation diode detecting a first voltage across the second and third terminals of said switching power transistor while in a conducting state and said gate driver control IC device monitoring a second voltage at said series resistor for protecting said switching power transistor and generating a signal to turn off the switching power transistor when the second voltage reaches a protection threshold.

2. The multi-wire common mode impedance choke as claimed in claim 1, wherein said current overload protection conducting path further comprises a capacitor to ground, said capacitor connected to a second end of said series resistor.

3. The multi-wire common mode impedance choke as claimed in claim 1, wherein the core is a toroidal core.

4. The multi-wire common mode impedance choke as claimed in claim 3, wherein each of the first inductor coil, the second inductor coil and the third inductor coil comprises an equal number of turns thereby each of the first, second and third inductor coil presenting a same magnetic inductance.

5. The multi-wire common mode impedance choke as claimed in claim 1, wherein said power supply driver circuit comprises multiple power supply units having multiple switching power transistors connected in parallel to drive a common load.

6. The multi-wire common mode impedance choke as claimed in claim 1, wherein said power supply driver circuit comprises multiple independently operating power supply units having corresponding switching power transistors controlled independently.

7. The multi-wire common mode impedance choke as claimed in claim 1, wherein said switching power transistor is a metal oxide semiconductor field effect transistor (MOSFET), said first terminal being a gate terminal, said second terminal being a source terminal and said third terminal being a drain terminal.

8. The multi-wire common mode impedance choke as claimed in claim 1, wherein said switching power transistor is a semiconductor insulated gate bipolar transistor (IGBT), said first terminal being a gate terminal, said second terminal being an emitter terminal and said third terminal being a collector terminal.

9. The multi-wire common mode impedance choke as claimed in claim 1, further comprising: a fourth wire connected in series between the first terminal of the switching power transistor and a Miller clamp signal line connected at a further input to the gate driver control IC device of said gate driver circuit, said fourth wire providing an additional impedance preventing additional differential mode transient signals generated by the switching power transistor from feeding back into the gate driver control IC device via said Miller clamp signal line.

10. The multi-wire common mode impedance choke as claimed in claim 9, wherein the additional impedance provided by the fourth wire further preventing additional common mode transient signals generated by the switching power transistor from feeding back into the gate driver control IC device via said Miller clamp signal line.

11. The multi-wire common mode impedance choke as claimed in claim 1, wherein the second output of the gate driver circuit is further connected to a load current sense conductor connected at an input to the gate driver control IC device of said gate driver circuit.

12. The multi-wire common mode impedance choke as claimed in claim 1, wherein the further impedance further preventing additional common mode transient signals generated by the switching power transistor from feeding back into the gate driver control IC device via the current overload protection conducting path.

\* \* \* \* \*